United States Patent [19]

Murata et al.

[11] Patent Number: 4,836,890

[45] Date of Patent: Jun. 6, 1989

[54] METHOD FOR PRODUCING OPTICAL INFORMATION RECORDING DISK

[75] Inventors: Yasushi Murata; Kunizho Ogoshi; Fumio Matsui, all of Saitama, Japan

[73] Assignee: Pioneer Electronic Corporation, Tokyo, Japan

[21] Appl. No.: 106,682

[22] Filed: Oct. 13, 1987

[30] Foreign Application Priority Data

Oct. 13, 1986 [JP] Japan .................................. 61-243542

[51] Int. Cl.$^4$ .............................................. B32B 31/04
[52] U.S. Cl. ................................... 156/73.1; 156/245; 156/257; 156/293; 346/135.1; 346/137; 360/97; 360/135; 369/284; 369/286
[58] Field of Search ............... 369/272, 264, 280, 282, 369/290, 291; 156/73.1, 245, 256, 257, 250, 283, 294, 514, 556; 346/135.1, 137; 360/97, 135

[56] References Cited

U.S. PATENT DOCUMENTS

| | | | |
|---|---|---|---|
| 4,549,922 | 10/1985 | Oishi et al. | 156/514 |
| 4,630,156 | 12/1986 | Saito | 346/137 |
| 4,698,715 | 10/1987 | Oishi | 360/135 |
| 4,704,649 | 11/1987 | Oishi | 360/97 |

FOREIGN PATENT DOCUMENTS 0136041 4/1985 European Pat. Off. .

Primary Examiner—Caleb Weston
Attorney, Agent, or Firm—Sughrue, Mion, Zinn, Macpeak & Seas

[57] ABSTRACT

A method for manufacturing an optical information recording disk having a reduced eccentricity between the center hole of the disk and the recorded track. A transparent circular substrate is provided having a large circular hole. A metal lamination disk member is formed having an outer diameter larger than the inner diameter of the hole in the substrate and an inner diameter smaller than the inner diameter of the hole in the substrate. The metal lamination disk member is placed on the substrate with a first adhesive and concentrically arranged relative to the substrate. A second adhesive is applied to peripheral side surface portions of the metal lamination disk member in the vicinity of the surface of the circular substrate. The second adhesive is hardened to temporarily fix metal lamination member to the substrate, and then the first adhesive is hardened.

10 Claims, 1 Drawing Sheet

METHOD FOR PRODUCING OPTICAL INFORMATION RECORDING DISK

BACKGROUND OF THE INVENTION

The present invention relates to a method for producing an optically recorded disk such as a read-only optical disk, a write-once type optical disk, a read-write optical disk, or the like.

In an optical disk such as a video disk or the like, the radial interval between adjacent tracks of pits or guide grooves concentrically and spirally formed on a recording surface of the disk is a minute value of about 1.6 μm. When such an optical disk is mounted on a turntable of a reproducing apparatus, a spindle of the turntable is fitted into the center hole of the disk. Accordingly, the positioning of the optical disk relative to the spindle is extremely important in view of the accuracy of rotation of the disk. Further, if the displacement of the center of the optical disk is large, accurate tracking by the laser beam of the optical pickup may be impossible, even though a tracking servo is provided to correct tracking errors because the range of the servo is exceeded. Accordingly, when a center hole of an optical disk is formed, a highly accurate process is required so as to make as small as possible the amount of displacement (eccentricity) of the center point of the center hole from the true center point of the recorded track.

Conventionally, formation of the center hole of an optical disk has been performed by cutting a substrate of a transparent circular plate prepared by injection molding of poly methyl methacrylate (PMMA) resin, polycarbonate PC resin or the like. The center of the substrate (the center of the spiral of guide grooves) is determined using an optical instrument, and the substrate is bored while being firmly fixed. In the cutting process, however, there has been a problem in that the cutting machine is large in size and the substrate tends to suffer damage on its surface.

Further, alternatively, a metal mold which can form a center hole of a substrate has sometimes been used so as to directly mold a substrate having a center hole while the substrate is being formed through injection molding with resin. In this case, however, there is a problem in that the accuracy is so low that a center hole with acceptable circularity and concentricity cannot be obtained.

In order to solve the foregoing problems, there has been proposed an optical disk constructed such that, as shown in FIG. 1, a metal hub 25 is fixed at a center portion of a substrate 22 provided with rows of pits or guide grooves formed concentrically or spirally, and a center hole 23 is formed in the metal hub 25 at a center portion thereof. In such an optical disk, because the center hole 23 is formed in the metal hub 25, a perfectly circular center hole can be easily obtained. Accordingly, not only can the eccentricity of the optical disk be reduced, but it becomes possible to use a magnetic clamping technique whereby a magnet is used in a clamping mechanism in the reproducing apparatus for clamping the optical disk via the metal hub 25 to thereby fix the optical disk at the playing position.

However, there is a problem in that the metal hub 25 and the substrate 22 consist of respectively, an inorganic material, and an organic material, and therefore, not only it is difficult to adhere the former to the latter, but it is also impossible to obtain a wide junction area between the metal hub 25 and the substrate 22. Hence, it is difficult for the metal hub 25 to adequately support the substrate 22. Further, the metal hub 25 has a tendency to separate from the substrate when the optical disk is rotating.

Further, in order to join the metal hub 25 and the substrate 22, there has been considered a joining method using ultrasonic welding in which a resin layer is formed between the metal hub 25 and the substrate 22, and ultrasonic waves are applied to the metal hub 25 and the substrate 22 from both the metal hub side and the substrate side to thereby join them to each other. In this method, however, only thermoplastic resin can be used as the substrate 22 and the resin layer. Accordingly, there is a problem in that the range of selection of the material of the substrate 22 is narrow. There is a further problem in that a horn portion of the apparatus generating the ultrasonic waves must be placed in contact with the metal hub 25 and the substrate 22 after a positioning step in which the respective centers of the metal hub 25 and the substrate 22 are caused to coincide with each other. As a result, vibration due to the contact of the horn portion with the metal hub 25 and the substrate 22 is unavoidably generated, making it difficult to perform accurate centering between the metal hub 25 and the substrate 22.

SUMMARY OF THE INVENTION

It is therefore an object of the present invention to eliminate the foregoing disadvantages in the prior art optical disk production methods.

It is another object of the present invention to provide a method in which a durable optical disk having a center hole of small eccentricity can be produced with a small number of production steps.

In order to attain the above objects, the method of producing an optical information recording disk according to the present invention comprises the steps of: forming a spiral guide groove on a main surface of a transparent circular substrate concentrically with a large circular center hole in the substrate; forming a metal lamination disk member having an outer diameter larger than the inner diameter of the large circular center hole and having a small circular center hole with an inner diameter smaller than the inner diameter of the large circular center hole; positioning the small circular center hole of the metal lamination disk member concentrically with the guide groove spiral; mounting the metal lamination disk member on the main surface of the circular substrate using a first adhesive agent; and applying a second adhesive agent to a peripheral side surface portion of the metal lamination disk member in the vicinity of the surface of the circular substrate and then hardening the second adhesive agent faster than the first adhesive agent.

BRIEF DESCRIPTION OF THE DRAWINGS

The above and other objects of the present invention will be apparent from the following detailed description taken in conjunction with the accompanying drawings in which.

DESCRIPTION OF THE PREFERRED EMBODIMENTS

A preferred embodiment of the present invention will be described hereunder in detail with reference to the accompanying drawings.

First, a transparent circular substrate 7 (See FIGS. 3A–3D) having a large circular center hole at its center is formed of PMMA resin through injection molding. The inner diameter of the large circular center hole is smaller than the outer diameter of a metal lamination disk member 1 which is formed in the next step.

Figure 1:
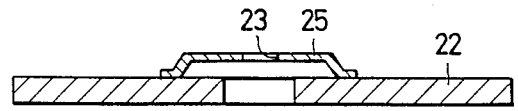
FIG. 1 is a schematic sectional view for explaining the conventional transferring step.
Figure 2:
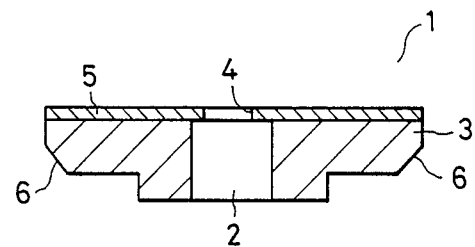
FIG. 2 is an enlarged sectional view showing a disk of metal lamination.

Next, the metal lamination disk member 1 having a diameter of 25 mm, as shown in the cross section of FIG. 2, is formed. The metal lamination disk member 1 is constituted by a center support 3 of PMMA resin and a circular metal plate 5. The center support 3 is constituted by a circular plate portion having a center hole 2 and a projecting cylindrical portion surrounding the center hole 2. The circular metal plate 5, which is fixed to a flat main surface of the center support 3, has a small circular hole 4, which is subsequently formed into the center hole of the optical disk. The center support 3 is formed of PMMA resin through injection molding.

The joining between the circular metal plate 5 and the center support 3 is performed, for example, by an insert injection method in which a metal plate is inserted into a metal mold having the desired shape of the center support and resin is injected into the metal mold so as to mold the center support. Otherwise, it is possible to use an ultrasonic welding method in which a molded center support and a metal plate are stacked together with the flat main surface of the former contacting a main surface of the latter, and ultrasonic waves are applied to the center support and the metal plate from opposite sides to thereby cause the center support and the metal plate to adhere to each other. In this process, the horn of the ultrasonic wave generator should contact both the center support and the metal plate. Still further, it is possible to employ an adhesive agent method in which a center support and a metal plate are fixed together through an adhesive agent and then the adhesive agent is hardened. Also, an adhesive tape method can be used in which a flat main surface of the center support is adhered to a main surface of a metal plate using a double-sided adhesive tape.

The circular metal plate 5 is formed so as to have a diameter larger than that of the large circular center hole of a substrate 7 (FIGS. 3A to 3D). The inner diameter of the center hole 2 of the center support 3 is made larger than that of the small circular center hole 4 in the metal plate 5 so as to use the center hole 4 of the metal plate 5 as a small circular center hole for the metal lamination disk member 1. Accordingly, the small circular center hole 4 of the metal plate 5 should be formed so as to be perfectly circular since the small circular center hole 4 is used as a through hole which receives the spindle of a transfer apparatus when the center of the metal lamination disk member 1 is aligned with the center of a spiral guide grooves on a stamper in subsequent transfer step. Also, the spindle of the clamping mechanism of the reproducing apparatus will pass through this hole after completion of the optical disk when it is played.

Further, in the other main surface of the center support 3 in opposition to the metal plate 5 of the metal lamination disk member 1, it is preferable to cut off a circumferential corner portion of the metal lamination disk member 1 to form a slanting circumferential edge portion 6 so that the adhesive agent is prevented from flowing out from the member 1 and fouling the surface of the substrate when the substrate is pressed onto the metal lamination disk member 1.

FIGS. 3A to 3D are schematic cross sections showing the steps of fixing the metal lamination disk member 1 onto the substrate in the process according to this embodiment of the present invention.

Similar to the conventional transfer method, ultraviolet-setting resin in a liquid phase is applied to a stamper attached to a support of a transfer apparatus, a substrate prepared by injection molding is concentrically mounted on the stamper through the resin in a liquid phase by fitting a center hole of the substrate onto a spindle of the support, and the ultraviolet-setting resin is irradiated with ultraviolet rays from the substrate side so as to hardened it to thereby fix the guide groove layer 18 constituted by the hardened ultraviolet-setting resin to the main surface of the substrate and thus complete the transfer of the surface shape of the stamper. The thus-obtained guide groove layer 18 is provided at its outer surface with a spiral guide groove formed concentrically with the large circular center hole of the substrate. Then, the substrate is separated from the stamper to thereby obtain the substrate 7 as shown in FIG. 3A on which the guide groove layer 18 is formed.

The substrate 7 having the spiral guide groove layer 18 formed in the above-described manner is mounted on a rotary table (not shown) having a substrate moving and positioning mechanism to thus determine the center point of the substrate 7. The turntable is movable in X and Y directions (i.e., directions perpendicular to each other) as well as in the direction of the rotary axis of the turntable. In the step of centering the substrate 7, a guide groove at the innermost circumference of the substrate 7 is viewed by the operator through a microscope or the like while rotating the rotary table to inspect the state of bias of the guide groove at the innermost circumference of the substrate 7. The position of the rotary table is suitably adjusted so as to decrease the bias of the guide groove at the innermost circumference. The position where the bias is reduced to zero is determined as the center of the guide groove spiral.

Figure 3A:
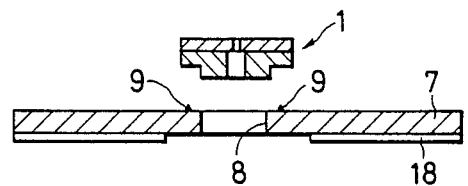
FIGS. 3A to 3D are a series of schematic sectional views used for explaining the process according to the present invention.

Next, as shown in FIG. 3A, a first adhesive agent 9 is applied to the circumference of the large circular center hole 8 on the other main surface of the substrate 7 opposite the main surface carrying the guide groove spiral layer 18 with the center point determined as described above.

Figure 3B:
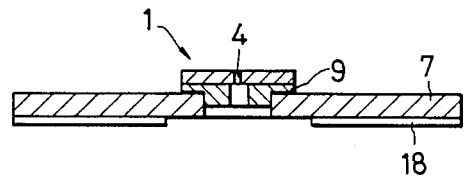

As shown in FIG. 3B, the metal lamination disk member 1 is mounted on the substrate 7 using the first adhesive agent 9 while the determined center of the substrate 7 is made to coincide with the center of the center hole 4 of the metal plate 5 of the metal lamination disk member 1. Although, in this embodiment, the metal lamination disk member 1 is attached to the other main surface of the substrate 7 in opposition to the main surface of the same carrying the guide groove spiral layer 18, the metal lamination disk member 1 may be attached to the same main surface on which the guide groove spiral layer 18 is formed.

Figure 3C:
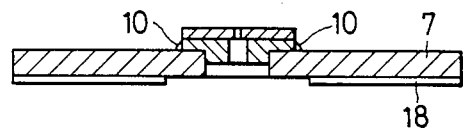

Next, as shown in FIG. 3C, ultraviolet-setting resin 10 is applied as a temporary fixing adhesive agent to a circumferential edge corner portion of the. metal lamination disk member 1 along the entire circumference thereof where the circumferential edge side surface of the metal lamination disk member 1 is in contact with the main surface of the substrate 7. At this time, if the temporary fixing adhesive agent 10 is applied to a recess portion defined by the circumferential slanting portion 6 (See FIG. 2) of the metal lamination disk member 1 and the main surface of the substrate 7, the temporary fixing adhesive agent 10 will not spread due to the retentive force of the surface tension of the adhesive, preventing the substrate 7 from being fouled. Further, the bonding area is increased so that the adhering force between the metal lamination disk member 1 and the substrate 7 after hardening is increased.

Figure 3D:
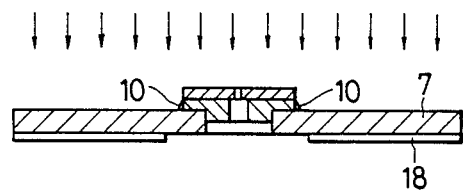

As shown in FIG. 3D, the circumferential edge corner portion of the metal lamination disk member 1 is irradiated with ultraviolet rays (indicated by arrows in the drawing) so that the temporary fixing adhesive agent 10 is hardened. After the metal lamination disk member 1 has been temporarily fixed to the substrate 7, the first adhesive agent 9 is gradually hardened to thereby firmly fix the metal lamination disk member 1 to the substrate 7. Thus, the small circular center hole of the substrate 7 is formed.

The temporary fixing adhesive 10 is not limited to ultraviolet-setting resin. It is preferable though to select an adhesive agent which may easily be hardened faster than the first adhesive agent 9. For the first adhesive agent 9, in order to attain a strong adhering force, it is preferable to select an adhesive agent belonging to the same group as the material of the metal lamination disk member 1 and the substrate 7. In this embodiment, an acrylic group adhesive agent is used as the first adhesive 9. Further, the same ultraviolet-setting adhesive may be used as the first adhesive agent 9 as well as the temporary fixing adhesive agent 10. In this case, the metal lamination disk member 1 may be temporarily fixed to the substrate 7 by irradiating first only the temporary-fixing adhesive agent with ultraviolet rays.

Thereafter, a signal recording layer is formed on the surface of the substrate 7 carrying the guide groove layer 18 and assembled together with members such as a spacer and protective plate to thereby complete the optical disk.

According to the invention, it is not necessary to provide a step of cutting the center hole or the outer circumference of the substrate. Hence, it is made possible to produce an optical disk having a perfectly accurate circular center hole with a negligibly small eccentricity.

Further, because the thus-obtained optical disk has the metal layer portion, if a magnetic metal is used in the metal layer portion, it is possible to use a magnetic clamping technique in the reproducing apparatus. That being the case, it is possible to reduce the size of the clamping mechanism.

As described above, in the method according to the present invention, the substrate and the metal lamination disk member can be formed separately from each other, and the two members then joined together over their whole main surfaces. Therefore, hole drilling can be performed in the metal portion of the metal lamination disk member with a high accuracy. Further, displacement of the metal lamination disk member relative to the substrate is prevented by the temporary fixing step (before the first adhesive agent has been hardened), so that it is possible to obtain an optical disk having a perfectly circular center hole and having a very small eccentricity. Furthermore, since the bonding steps are performed twice, it is possible to obtain an optical disk having a strong center portion. Moreover, no hardening or drying steps requiring a considerably long time are employed, and hence the total production time can be shortened.

What is claimed is:

1. A method for producing an optical information recording disk, comprising the steps of:
    forming a spiral guide groove on a first main surface of a transparent circular substrate having a large circular center hole, said spiral guide groove being formed such that it is concentric with the large circular center hole of said substrate;
    forming a metal lamination disk member having an outer diameter which is larger than an inner diameter of said large circular center hole, and having a small circular center hole with an inner diameter which is smaller than said inner diameter of said large circular center hole;
    positioning said small circular center hole of said metal lamination disk member such that it is concentric with respect to said spiral guide groove;
    adhering said metal lamination disk member to a second main surface of said transparent circular substrate with a first adhesive agent, the second main surface being opposite to the first main surface of said transparent circular substrate;
    applying a second adhesive agent to a peripheral side surface portion of said metal lamination disk member in the vicinity of said first main surface of said circular substrate;
    hardening said second adhesive agent before said first adhesive agent hardens to thereby temporarily fix said metal lamination disk member to said circular substrate; and
    hardening said first adhesive agent.

2. The method for producing an optical information recording disk of claim 1, wherein said metal lamination disk member comprises: a circular support having a center hole and a projecting cylindrical portion surrounding said center hole, and a circular metal plate fixed to a flat main surface of said circular support, said metal plate having a smaller circular hole than said circular support.

3. The methods for producing an optical information recording disk of claim 2, wherein said circular support and said transparent circular substrate comprise the same material.

4. The method for producing an optical information recording disk of claim 2, wherein said metal lamination disk member is produced by a process comprising the steps of: placing said circular metal plate in a mold having the desired shape of said metal lamination disk member, and injecting resin into said mold to mold said metal lamination disk member.

5. The method for producing an optical information recording disk of claim 2, wherein said metal lamination disk member is produced by a process comprising the steps of: stacking said circular metal plate and said circular support; and ultrasonically bonding said metal plate to said circular support.

6. The method for producing an optical information recording disk of claim 5, wherein, in said step of ultrasonically bonding, ultrasonic waves are applied from opposite sides of the stacked circular metal plate and circular support.

7. The method for producing an optical information recording disk of claim 2, wherein said metal lamination disk member is produced by a process comprising the steps of: stacking said circular metal plate and said circular support with an adhesive therebetween; and hardening said adhesive.

8. The method for producing an optical information recording disk of claim 2, wherein said metal lamination disk member has a slanting circumferential edge portion for receiving said second adhesive agent.

9. The method for producing an optical information recording disk of claim 1, wherein said first an second adhesive agents and said substrate each comprises an arcylic resin.

10. The method for producing an optical information recording disk of claim 2, wherein said circular metal plate is made of a magnetic material.

* * * * *